Patented Mar. 31, 1936

2,035,528

UNITED STATES PATENT OFFICE 2,035,528

SYNTHETIC RESIN

Merlin Martin Brubaker, Wilmington, Del., assignor to E. I. du Pont de Nemours & Company, Wilmington, Del., a corporation of Delaware No Drawing. Application April 16, 1932, Serial No. 605,798

8 Claims. (Cl. 260—8)

This invention relates to new resinous compositions, and more particularly to resins of the polyhydric alcohol-polybasic acid type and to compositions comprising these resins.

This invention has as an object the production of improved resins and coating compositions containing them. A further object is the preparation of resinous materials which are especially adapted for use in lacquers, enamels, varnishes, and protective coatings in general.

These objects are accomplished by the following invention in which a resin is synthesized by heat-treatment of a polyhydric alcohol, a polybasic acid, and a high molecular weight monohydric aliphatic alcohol.

Aliphatic alcohols containing no more than 5 carbon atoms, as well as certain ethers and esters of polyhydric alcohols, have been suggested as a partial substitute for the polyhydric alcohol in polyhydric alcohol-polybasic acid resins. However, the remarkable advantages attending the use of alcohols of high molecular weight of the type R—OH (where R is a saturated or unsaturated aliphatic hydrocarbon radical of at least 7 carbon atoms) as disclosed herein, have, insofar as I am aware, escaped prior investigators. I have found that the products obtained by using these higher alcohols, are quite different in nature from those obtained with the lower monohydric alcohols such as ethyl or butyl.

In carrying out the invention, the polyhydric alcohol, polybasic acid, and higher aliphatic alcohol are heated together at any suitable temperature until resinification occurs. The apparatus preferably consists of a vessel fitted with a stirrer, thermometer, and a short air-cooled reflux condenser. For economic reasons, glycerol and phthalic anhydride are preferred as the polyhydric alcohol and polybasic acid. I generally prefer to substitute the monohydric alcohol, in chemically equivalent amounts, for 10–60% of the polyhydric alcohol, although I do not wish to be limited to these figures. The amount of monohydric alcohol to be used for best results will vary according to the nature of the monohydric alcohol, the polyhydric alcohol and the polybasic acid, as well as the presence or absence of other ingredients, such as fatty acids. With polyhydric alcohols and polybasic acids of more than two hydroxyl or carboxyl groups, it is preferred to use more of the monohydric alcohol; when fatty acids are used as ingredients, it is preferred to use less of the monohydric alcohol.

Among the monohydric alcohols which are suitable for the practice of the present invention, there may be mentioned the alcohols derived from a special type of hydrogenation of fatty acids or fatty oils such as stearic acid and coconut oil, such hydrogenation causing the reduction of the acid to the alcohol. This is more fully explained hereinafter. Excess polyhydric alcohol is sometimes desirable in making my new resins, as for example, when the percentage of monohydric alcohol is relatively low and there are no other modifying agents present. Temperatures employed may vary to a considerable extent depending upon the boiling point of the monohydric alcohol and the amount present. The higher temperature which may be used in carrying out my invention as compared to the low temperatures which are necessitated by the prior practice is an advantage in my process which contributes to the improved properties of my resins. High temperatures cannot be used with a monohydric alcohol of comparatively low boiling point, such as the $C_7$ and $C_8$ alcohols, at least in the initial stages of resinification, because of loss by vaporization; this disadvantage is more pronounced with the alcohols of the prior art, (ethyl, butyl, amyl). Where the proportion of monohydric alcohol is low and no other monovalent ingredients are present, too high a temperature promotes the formation of an infusible and insoluble (gelled) resin. On the whole, temperatures range mostly from 165 to 250° C. As a rule, the temperature employed and the time and manner of heating are such that the lowest practical acid number may be obtained in the shortest possible time.

The following examples in which the parts are by weight are illustrative of the preferred method of carrying out my invention:

Example I

Two hundred nineteen (219) parts dodecyl alcohol (mol. wt. 184, acetyl No. 219—about 90% pure), 605 parts glycerol and 220.5 parts phthalic anhydride are heated to 200° C. over a period of about one hour. A suitable apparatus consists of a vessel fitted with an air-cooled reflux condenser and stirrer. The temperature is held for one hour at 200° C., then raised to 225° C. After a few minutes at this point a drop placed upon a glass plate is clear at room temperature. Heating and stirring is continued at 225° C. for six hours. Acid number, 32.3.

Example II

One hundred (100.0) parts cetyl alcohol, 41.5 parts glycerol, and 128.7 parts phthalic anhydride are heated in the apparatus of Example I to about 200° C. over a period of one hour. After an additional hour at this temperature, the mixture is clear when cold (as shown by a drop on a glass plate). The temperature is now raised to 225° C. and held at this point for seven hours. Acid number, 27.4.

Aliphatic alcohols containing one or more ethylene linkages, such as oleyl alcohol and geraniol, can be used in the practice of the present invention; such alcohols, due to their unsaturation, cause films of the resin to harden more rapidly. As additional resin ingredients, I may use esters such as fatty oils, dibutyl phthalate, and rosin glyceride (ester gum), and monobasic acids such as fatty acids, natural resin acids and aromatic acids; it is usually desirable to subject esters such as fatty oils to a preliminary alcoholysis by first heating them with the polyhydric alcohol, before adding the polybasic acid and the monohydric alcohol. The following example illustrates the use of an unsaturated alcohol, an additional modifying agent, and a different order of reacting the ingredients:

Example III

|  | Parts |
|---|---|
| Glycerol | 14.15 |
| Geraniol | 6.58 |
| Linseed oil acids | 56.11 |
| Phthalic anhydride | 23.16 |
|  | 100.00 |

All of the above ingredients except the glycerol are heated in the apparatus of Example I for about one hour at 175° C. The glycerol is then added and the temperature raised gradually to 225° C., where it is maintained for 5½ hours, or until an acid number of 4-5 is reached. A slow stream of carbon dioxide is led through the reaction vessel the last 4 hours of heating. A soft sticky resin is obtained which is soluble in esters, mineral thinner (aliphatic hydrocarbons) and alcohol-hydrocarbon mixtures. At 60% solids in mineral thinner solution, it shows a viscosity of about 1.0 seconds at 77° F. in the Gardner-Holdt tube. It can be used with cobalt drier as a varnish, or mixed with nitrocellulose and used as a lacquer. Enamels may be prepared from either solution (resin or resin mixed with nitrocellulose) by the addition of pigments such as chrome green, carbon black, etc. This resin is also especially valuable for the preparation of baking varnishes.

A mixture of aliphatic alcohols may be used, as indicated in the following two examples:

Example IV

Eighteen and two-tenths (18.2) parts glycerol, 57.8 parts phthalic anhydride and 24.0 parts of an aliphatic alcohol mixture obtained as a by-product in the synthesis of methanol by the hydrogenation of carbon oxides (the alcohol mixture being composed mostly of hexyl, heptyl, and octyl alcohols, having an average molecular weight of 120 and boiling at 140–165° C.) are heated up to 180° C. over a period of one hour. The apparatus consists of a vessel fitted with a stirrer, thermometer, and water-cooled reflux condenser. The mixture of immiscible liquids returning to the reaction vessel from the reflux passes through a mechanical "separator", at which point water is drawn off and the alcohols returned to the reaction vessel. The temperature is raised gradually to 210–215° C. and held at this point for 8–9 hours. The acid number of the product is 55.0.

Example V

Twenty-three and nine-tenths (23.9) parts glycerol, 44.0 parts phthalic anhydride and 32.1 parts "coconut oil alcohols" (comprising a mixture of n-octyl alcohol, n-decyl alcohol, dodecyl alcohol, tetradecyl alcohol, and traces of water and glycerol, and obtained by catalytic hydrogenation of coco-nut oil) are heated together as follows: one hour up to 200° C., one hour at 200° C., 14 hours at 225° C., total period of heating 16 hours. This resin does not become clear as easily as that of Example IV, some 8–10 hours at 225° C. being necessary to reach this point. The final acid number is 14.1.

Mixtures of monohydric alcohols of the type illustrated in Example V are especially suitable for the practice of this invention. These and many of my other monohydric alcohols can be most economically obtained by the catalytic hydrogenation of fatty oils, fatty acids, or the mixture of fatty acids obtained by saponification of the oil, according to the methods given in detail in a co-pending application by Wilbur A. Lazier (Serial No. 520,473 Patent No. 1,839,974). Such hydrogenation, which is carried out with special catalysts (difficultly reducible oxides of hydrogenating metals) under special conditions of temperature and pressure, is distinct from that well-known type in which the ethylenic linkages of the fatty acid radical are hydrogenated. Hydrogenation as described in the above application reduces the fatty acid to the monohydric alcohol, first causing a splitting of the ester linkage in the case of the fatty oils. The "coconut oil alcohols" of Example V contain, for example, n-octyl alcohol, n-decyl alcohol, dodecyl alcohol tetradecyl alcohol, and a small amount of glycerol; the presence of the latter in the monohydric alcohol mixture enhances, rather than detracts from, its utility. Likewise, hydrogenated coconut oil acids contain these same monohydric alcohols. Cottonseed oil yields a mixture comprising cetyl alcohol, oleyl alcohol, the alcohol obtained by reduction of the carboxyl group of linoleic acid, and traces of tetradecyl and octadecyl alcohols. Lauric acid yields dodecyl alcohol, stearic acid octadecye alcohol, and oleic acid a mixture of oleyl and octadecyl alcohols. It will be understood, however, that I do not wish to confine myself to this source for my monohydric alcohols, as many of them occur naturally or are obtainable by other means. Suitable monohydric alcohols therefore for the practice of this invention are such alcohols as the following, or mixtures thereof: n-heptyl, n-decyl, dodecyl, cetyl, tetradecyl, ceryl, myricyl, undecylenyl, oleyl, erucyl, carnaubyl, geranyl, and linalyl. Many of these alcohols are obtainable, usually as mixtures, as by-products from the synthesis of methanol and ethyl acetate; by the special catalytic hydrogenation of fatty oils, fatty acids and mixtures of fatty acids derived from the saponification of the fatty oil; from chlorination and hydroylsis of higher aliphatic hydrocarbons; and sometimes as commercial products such as "Lanette Wax", which is a mixture of cetyl and octadecyl alcohols. In the latter case, however, I do not include waxes of natural or synthetic origin containing monohydric alcohol esters of high fatty acids. The incorporation of such materials into polyhydric alcohol-polybasic acid resins requires a special procedure with which the present invention is not concerned.

The monohydric alcohols suitable for the present invention may be secondary or tertiary in nature as well as primary. The alcohol mixture of Example IV for instance contains some secondary heptyl and octyl alcohols. However, because of the relative ease of esterification, I generally prefer primary alcohols to secondary, and secondary to tertiary.

Variations in the manipulative steps for carrying out the process, such as simultaneous fusion of the ingredients in an open vessel, and the preparation of the resins under a water-cooled reflux condenser (where the alcohols used boil below 170° C. for example) or their preparation in an atmosphere of inert gas, e. g. nitrogen or carbon dioxide, will readily occur to those skilled in the art. Similarly, various methods of reacting the ingredients may be used for making these resins. Some of the methods that may be suggested are: heating the entire quantity of the polybasic acid with the monohydric alcohol, adding the polyhydric alcohol and heating to resinification; heating the monohydric alcohol with a part of the polybasic acid (in such proportions as to form the half ester, e. g. the acid phthalate), adding the polyhydric alcohol and the remainder of the polybasic acid, and heating to resinification; fusing the polybasic acid and polyhydric alcohol to effect an initial condensation, adding the monohydric alcohol, and heating to resinification. The resins of the present invention may also be made by heating the ingredients in an inert solvent, provision being made for the separation of the water of reaction. Regardless of the method selected for reacting the ingredients, the resins of this invention are defined as the reaction product of a polyhydric alcohol, a polybasic acid, and one or more monohydric aliphatic alcohols (of formula R—OH, where R is an aliphatic hydrocarbon radical of at least 7 carbon atoms), with or without one or more of the well-known acidic, alcoholic, or ester modifying agents (fatty oils, fatty acids, natural resins and their esters, and the monohydric alcohols of the prior art). For example, as resin ingredients which can be used in addition to the polyhydric alcohol, the polybasic acid and the higher aliphatic alcohol or alcohol mixture, I may employ one or more of the following: benzoic acid, salicylic acid, butyric acid, oleic acid, stearic acid, linseed oil acids, castor oil, linseed oil, China-wood oil acids, cottonseed oil acids, rosin, Congo, ester gum, butyl alcohol, benzyl alcohol, and cyclohexyl alcohol. When fatty oils are used as additional modifying ingredients, the oil is preferably heated first with the polyhydric alcohol in order to effect a preliminary alcoholysis to the mono- and/or diglycerides (or equivalent esters of other polyhydric alcohols). Castor oil, however, can be incorporated with equal facility without this preliminary step. For the alcoholysis of the other fatty oils, a small amount of a catalyst such as litharge or sodium hydroxide is generally used, and the heating is carried out at 200–250° C. for about one hour, with efficient stirring.

Any of the polyhydric alcohols and polybasic acids known by those skilled in the art to be useful in the manufacture of polyhydric alcohol-polybasic acid resins may be used in the practice of the present invention. As the polyhydric alcohol it is preferred to use glycerol, and among other suitable polyhydric alcohols there may be mentioned: ethylene glycol and homologs, e. g. propylene glycol; diethylene glycol and other polyglycols; polyglycerol; pentaerythritol; glycerol monochlorhydrin; polyglycerol; triethanolamine; sorbitol; monoalkyl and aryl ethers of glycerol, such as monoethylin and monobenzylin, ethers of other polyhydric alcohols, e. g. monoethyl-, dimethyl-, etc., ethers of sorbitol, pentaerythritol, etc.

In addition to phthalic anhydride, the following polybasic acids or anhydrides are mentioned as suitable: succinic, adipic, maleic, sebacic, tartaric, citric, dilactylic, thiodilactylic, salicylacetic, chlorophthalic, diphenic, naphthalic, pyromellitic, and quinolinic.

The resins disclosed herein are valuable ingredients of coating compositions. Examples VI and VII illustrate the preparation of nitrocellulose lacquers:

Example VI

| | Parts |
|---|---|
| Resin of Example I | 12.9 |
| Low viscosity nitrocellulose | 6.5 |
| Ethyl acetate | 21.1 |
| Butyl acetate | 14.0 |
| Cellosolve acetate | 1.7 |
| Ethyl alcohol | 4.9 |
| Butyl alcohol | 4.8 |
| "Hi-flash" naphtha | 8.6 |
| Xylol | 9.7 |
| Toluol | 9.7 |
| Aliphatic hydrocarbons | 6.1 |
| | 100.0 |

The ratio of resin to nitrocellulose in the above lacquer is 2:1. The resulting viscosity is 16.6 seconds in the No. 10 cup at 28° C., and the solids content 19.4%.

Example VII

| | Parts |
|---|---|
| Resin of Example V | 18.1 |
| Low viscosity nitrocellulose | 4.5 |
| Ethyl acetate | 14.7 |
| Butyl acetate | 9.7 |
| Cellosolve acetate | 1.2 |
| Ethyl alcohol | 3.4 |
| Butyl alcohol | 3.4 |
| "Hi-flash" naphtha | 27.1 |
| Xylol | 6.8 |
| Toluol | 6.8 |
| Aliphatic hydrocarbons | 4.3 |
| | 100.0 |

In the above lacquer the ratio of resin to nitrocellulose is 4:1. The resulting viscosity is 20 seconds in the No. 10 cup at 28° C., and the solids content 22.6%.

The lacquers given above are conveniently prepared by dissolving the resin in the Hi-flash naphtha and dissolving the nitrocellulose in a mixture of the ethyl alcohol, the cellosolve acetate, the aliphatic hydrocarbons, and a major part of the ethyl acetate; these two solutions are then blended and thinned with a mixture of the other solvents and the remainder of the ethyl acetate. Each lacquer can be applied by either spraying or brushing, and each dries rapidly, adheres well to both wood and metal, and shows an unusual durability. Instead of nitrocellulose, I may use other cellulose derivatives, such as cellulose acetopropionate, cellulose butyrate, ethyl cellulose, and benzyl cellulose.

My new resins are also suitable for the preparation of varnishes, either alone or blended by heating with natural gums and/or drying oils. The resin of Example III may be blended with ordinary rosin by heating two parts of the resin and one part of rosin for 1 hour at 200° C., thinning while hot and stirring in cobalt drier solution. Or, a solution of the resin itself, such as the following may be used directly as a varnish:

Example VIII

| | Parts |
|---|---|
| Resin of Example III | 70 |
| Mineral thinner | 28 |
| Drier solution (0.1% cobalt) | 2 |
| | 100.0 |

When applied over metal previously coated with primers and surfacers, this resin was still in good condition after 370 days' exposure to weathering, whereas the corresponding resin prepared from glycerol, phthalic anhydride, and linseed oil acids alone failed after 250 days. This difference is even more pronounced when the two films are baked (1½ hours at 175° F.). I have also compared a resin prepared from borneol, linseed oil acids, glycerol and phthalic anhydride with the corresponding resin prepared from geraniol, linseed oil acids, glycerol, and phthalic anhydride and found that baked films of the former fail after 95 days' exposure while films of the latter are good at least 370 days. The geraniol resin referred to at this point contained twice the amount of geraniol (substituted for glycerol) as was used in making the resin of Example III.

As a further illustration of the improved properties of my resins, I have found that a resin prepared from glycerol 16.9 parts, geraniol 6.6 parts, phthalic anhydride 32.7 parts, linseed oil acids 31.3 parts and China-wood oil acids 12.5 parts could be thinned to 30% solids or lower with mineral thinner, while the corresponding resin in whose preparation no geraniol was used would tolerate only a small amount of the same solvent (60-70% solids).

As a still further illustration of the improved properties of my resins, the nitrocellulose lacquer of Example VI (made with the dodecyl alcohol modified resin of Example I) may be compared with the corresponding nitrocellulose lacquer made with a butyl alcohol modified resin (prepared by reacting 19.73 parts butyl alcohol, 23.52 parts glycerol, and 56.75 parts phthalic anhydride). In both cases, the ratio of resin to nitrocellulose was four parts to one. Both lacquers were subjected to outdoor exposure over metal and over wood. The butyl alcohol modified resin lacquer failed after 280 days over metal and after 80 days over wood; the dodecyl alcohol modified resin lacquer failed only after 367 days over plain steel, and after 240 days over wood. In addition, the butyl alcohol resin lacquer was very slow drying in comparison, and the film was much softer, more easily marred, and collected dirt badly. Because of this typical softness of the lower alcohol modified resins only limited amounts can be successfully used with nitrocellulose; this has a deleterious effect on their durability. Much higher ratios of resin:nitrocellulose can be successfully used with my resins.

My improved resins not only form valuable ingredients for protective coatings, such as lacquers, enamels and varnishes, but they are also of especial utility in the manufacture of adhesives and cements for general use, as for glass plates, mica, and cellulose acetate in the manufacture respectively of safety glass, insulating materials, and laminated products; impregnating agents for wood pulp, paper, cloth, and porous materials in general; molding plastics with or without pigments and fillers; etc.

It will be understood by those skilled in the coating composition art that solvents, pigments, driers, antioxidants, etc. may be employed in conjunction with my resins where needed and desired. When my improved resins are used in molding compositions, any of the ordinary fillers or methods of mixing and molding may be used.

As will be apparent from the foregoing, I have described new resins of the polyhydric alcohol-polybasic acid class which are valuable in the coating composition and other arts. Certain new alcoholic ingredients have been discovered to give this type of resin the desirable properties of increased durability, water-resistance, and tolerance to aliphatic hydrocarbon solvents. The durability is greater than that of the corresponding resins in whose preparation no higher aliphatic alcohols were used, as well as being greater than that of analogous resins made with the monohydric alcohols of the prior art. Certain disadvantages attendant upon the use of the prior art alcohols have been dispensed with. It is very difficult to use monohydric alcohols of the high volatility characteristic of ethyl, butyl, and amyl alcohols as resin ingredients inasmuch as temperatures sufficiently high to cause resinification cannot be employed without vaporizing the alcohol. As a result, a high degree of esterification, which is known to be coincident with film durability, cannot be attained. I have discovered that these process and product advantages are shown definitely with alcohols of at least 7 carbon atoms, though the differences between $C_5$ and $C_7$ alcohols admittedly are not as great as between the $C_5$ and $C_8$ alcohols, nor the difference between the latter as great as between the $C_5$ and $C_{10}$ alcohols, etc. Insofar as I am aware, there is no upper limit to the carbon content of the monohydric alcohol, this being limited only by the necessity of the alcohol melting at a temperature below the upper limit of the esterification range (about 275° C.).

As many apparently widely different embodiments of this invention may be made without departing from the spirit and scope thereof, it is to be understood that I do not limit myself to the specific embodiments thereof except as defined in the following claims.

I claim:

1. A resinous reaction product of a polyhydric alcohol, a resinifying polycarboxylic acid and a substantial amount of at least one alcohol of the class consisting of carnaubyl, ceryl, cetyl, decyl, dodecyl, erucyl, geranyl, heptyl, linalyl, myricyl, oleyl, octadecyl, octyl, tetradecyl and undecylenyl alcohol.

2. The resinous reaction product of a polyhydric alcohol, a resinifying polycarboxylic acid, and a mixture of high molecular weight alcohols obtained by the hydrogenation of a substance selected from the class consisting of fatty oils, fatty oil acids and carbon oxides.

3. A resinous reaction product of a polyhydric alcohol, a resinifying polycarboxylic acid, and a mixture of alcohols obtained by the hydrogenation of coconut oil.

4. The resinous product set forth in claim 1 in which the polyhydric alcohol is glycerol and the polycarboxylic acid is phthalic anhydride.

5. The resinous product set forth in claim 3 in which the polyhydric alcohol is glycerol and the polycarboxylic acid is phthalic anhydride.

6. A process which comprises heating to resinification a polyhydric alcohol, a resinifying polycarboxylic acid, and a mixture of alcohols obtained by the hydrogenation of substances selected from the class consisting of fatty oils and fatty oil acids.

7. The resinous reaction product of a polyhydric alcohol, a resinifying polycarboxylic acid, and a mixture of alcohols obtained by the hydrogenation of cotton seed oil.

8. The resinous reaction product of glycerol, phthalic anhydride, and dodecyl alcohol.

MERLIN MARTIN BRUBAKER.